Patented July 6, 1948

2,444,538

UNITED STATES PATENT OFFICE 2,444,538

PROCESS FOR THE PRODUCTION OF BUTADIENE AND CATALYST THEREFOR

George W. Seymour and Fred Fortess, Cumberland, Md., assignors to Celanese Corporation of America, a corporation of Delaware No Drawing. Application August 19, 1943, Serial No. 499,230

7 Claims. (Cl. 260—681)

This invention relates to the production of unsaturated hydrocarbons and relates more particularly to the production of unsaturated hydrocarbons by the catalytic vapor phase dehydration of polyhydroxy compounds.

An object of this invention is to provide an improved process for the production of unsaturated hydrocarbons by the catalytic vapor phase dehydration of aliphatic polyhydroxy compounds.

Another object of this invention is the provision of novel, highly-effective catalysts adapted to be employed in the vapor phase dehydration of aliphatic polyhydroxy compounds, which catalysts have an unusually long active life.

A further object of this invention is to provide improved processes for the regeneration of spent catalysts employed in the vapor phase dehydration of aliphatic polyhydroxy compounds by catalytic processes.

Other objects of our invention will appear from the following detailed description.

The dehydration of aliphatic polyhydroxy compounds in the vapor phase by catalytic processes yields unsaturated hydrocarbons. The latter form a valuable class of compounds which may be converted into a wide variety of useful products. Currently, one of the most valuable members of the class of unsaturated hydrocarbons is butadiene, a raw material employed in the manufacture of several types of synthetic rubber. A disadvantage heretofore encountered in the catalytic vapor phase dehydration of aliphatic polyhydroxy compounds is that the catalysts employed therein possessed a satisfactory degree of activity for only a relatively short period of time. The efficiency of the catalysts drops quite rapidly in service due to the deposit of tars and other carbonaceous materials thereon, and the spent or inactive catalysts must then be replaced. The spent catalysts may be regenerated in some instances and restored, but with a somewhat limited degree of activity.

We have now discovered that aliphatic polyhydroxy compounds may be dehydrated in the vapor phase to unsaturated hydrocarbons by processes employing certain new and valuable catalysts which possess high efficiency, relatively long life and are capable of being restored substantially to their original activity by novel regeneration processes.

The dehydration catalysts of our invention comprise a mixture of an alkali metal salt of an oxygen acid of phosphorus having an acid reaction together with an alkaline earth metal salt of an oxygen acid of phosphorus having an acid reaction and at least one member of the group consisting of free phosphoric acid and a salt of phosphoric acid adapted to decompose under reaction conditions to yield free phosphoric acid. When used alone or placed on a suitable inert carrier and employed in vapor phase dehydration processes, our novel dehydration catalysts are capable of producing a high degree of conversion of aliphatic polyhydroxy compound into unsaturated hydrocarbons and of maintaining this high degree of conversion over a substantial period of time.

As a suitable alkali metal salt of an oxygen acid of phosphorus having an acid reaction there may be mentioned primary sodium phosphate, while an example of a suitable alkaline earth metal salt of an oxygen acid of phosphorus having an acid reaction is secondary calcium phosphate. Salts of phosphoric acid which are adapted to decompose under reaction conditions to yield the free acid are the alkyl amine salts of phosphoric acid, such as N-butylamine phosphate, or ammonium salts such as secondary ammonium phosphate.

The catalysts employed in accordance with this invention may be prepared in any suitable manner. For example, they may be prepared by mixing the desired alkali metal salt and alkaline earth metal salt, where the latter is to be employed, using enough water to facilitate intimate mixing, with phosphoric acid and/or a phosphoric acid salt yielding phosphoric acid under reaction conditions to form a thick paste which is then dried at an elevated temperature, the resulting product being a hard, solid cake of a porous structure. The cake is reduced to pieces of the desired diameter by a crushing operation and these hard, porous pieces are employed as the catalytic material. When an inert carrier such as pumice, flake graphite or activated carbon is employed, the carrier may be mixed with the catalytic materials to yield a paste and the resulting paste is rolled into balls or shaped into the form of a flat cake and dried. The dried balls or cake may be reduced to particles of the desired size by crushing and the particles employed as catalyst in the vapor phase dehydration process. The catalysts described above may also be deposited from suspension or solution on the surface of large particles of the inert carriers.

The vapor phase dehydration of the aliphatic polyhydroxy compounds to the corresponding unsaturated hydrocarbons employing our novel catalysts is usually carried out at a temperature of from 220 to 400° C. depending upon the particular polyhydroxy compound being dehydrated. Preferably, when preparing butadiene from 1:3-butane-diol the temperature in the catalyst chamber is maintained at about 270° C. The pressure in the system during the dehydration process is preferably atmospheric, though higher or lower pressures may be employed.

In carrying out the dehydration process the catalyst particles are charged into a suitable reaction chamber and the temperature of the chamber is raised gradually to the desired point. The aliphatic polyhydroxy compound to be dehydrated is entered at a controlled rate into a preheater where it is vaporized, the resulting vapors being passed through the heated reaction chamber and over the catalyst particles. The catalyst effects a dehydration, i. e. a splitting of water from the molecule of the polyhydroxy compound, and the products obtained are the unsaturated hydrocarbon, water, unreacted polyhydroxy compound, partially dehydrated polyhydroxy compound and such side reaction products as aldehydes. The mixture of dehydration products is passed through a cold water condenser to remove most of the water, unreacted polyhydroxy compound, partially dehydrated polyhydroxy compounds, and other condensable byproducts from the unsaturated hydrocarbons. The unsaturated hydrocarbon vapors are then passed through a drying tower containing anhydrous calcium sulfate to remove the last traces of water and then through a tower containing sodium hydroxide supported on asbestos to remove any volatile aldehydes formed as by-products. The hydrocarbons may then be condensed employing a low temperature condensing system comprising solid carbon dioxide and acetone, whereby a temperature below −50° C. may be maintained or by subjecting the vapors to pressure sufficient to cause liquefaction.

The efficiency of the catalytic conversion is determined by measuring the yield on a weight basis of the material condensed in the low temperature condensing system as compared to the weight of polyhydroxy compound reacted over the catalyst. Inasmuch as the condensables are primarily unsaturated hydrocarbon, i. e. from 90 to 99% is generally unsaturated hydrocarbon, this comparison is an excellent gauge of the effectiveness of the catalyst as a dehydrating agent.

Our novel catalytic dehydration process is especially valuable for the vapor phase catalytic dehydration of 1:3-butane-diol to butadiene. In carrying out the dehydration of 1:3-butane-diol, the vapors of the latter are preferably diluted with water as they are passed to the catalyst chamber. Usually an aqueous mixture comprising from 50 to 80% of 1:3-butane-diol and from 50 to 20% of water is satisfactory. The rate at which the liquid mixture is vaporized and fed to the catalyst chamber may vary but, usually, from 0.1 to 1 volumes of liquid are vaporized and entered into the reaction chamber per hour per volume of catalyst present. The catalyst may be maintained at a temperature of from 250 to 300° C., but a temperature of about 270° C. has been found to yield optimum results.

Our novel catalysts exhibit excellent longevity employed under the above conditions. For commercial purposes, we have found that the most desirable results are obtained when the catalyst is employed only to the point where it is sufficiently active to convert about 55% of the 1:3-butane-diol per pass through the heated catalytic reaction chamber, to materials condensable in the acetone-carbon dioxide condensing system. When the conversion per pass drops below this figure the catalyst is preferably regenerated.

The regeneration of the catalysts may be effected by either physical or chemical methods, or both. The regeneration preferably is carried out by physical methods where the catalyst is one which does not contain a salt of phosphoric acid which decomposes during the catalytic conversion process to yield phosphoric acid. Such methods comprise heating the catalyst to temperatures of about 350° C. while passing a fast stream of air containing water vapors over the catalyst and then, after reducing the temperature to about 140 to 160 °C., blowing the catalyst with steam. A steaming treatment of 4 to 6 hours is usually sufficient. The catalyst is then ready for further use at dehydration temperatures and the activity is substantially improved.

Where the catalysts employed contain a salt such as N-butylamine phosphate or secondary ammonium phosphate, which salt decomposes under reaction conditions to yield phosphoric acid, chemical regeneration methods preferably are employed. The chemical regeneration is effected after the spent catalyst is first subjected to the physical regeneration procedure outlined above, comprising heating with air followed, usually, by steaming. The steaming may follow or be carried out concurrently with the heating in some cases. Thus, for example, where the spent catalyst being regenerated included N-butylamine phosphate in its active state, heating with air and steam at about 300 to 375° C., say 350° C. for from 4 to 8 hours and then passing a 20% aqueous solution of N-butylamine in vapor form over the catalyst at 110 to 160° C., say 130° C., causes the catalyst to be regenerated. More advantageous results may be obtained if from 0.5 to 2.0% by weight of N-butylamine is included in the aqueous solution of 1:3-butane-diol which is vaporized and subjected to dehydration over the regenerated, reactivated catalyst.

The regeneration of spent catalysts comprising, for example, secondary ammonium phosphate, in the initial, active form, may be effected by first heating with air at elevated temperature, followed by steaming, as described, and then passing gaseous ammonia over the spent catalyst at temperatures below 80° C.

The initial physical regeneration effected by heating the spent catalyst to elevated temperatures and then steaming, causes a substantial change in the character of those catalysts normally containing a decomposable salt of phosphoric acid in their original, active form. The salt is decomposed by the high temperature employed during the heating and the effect of this change results in the production of a regenerated, active catalyst containing free phosphoric acid, of the type previously described. The regenerated catalyst may be used in this form or may then be chemically regenerated, as described.

Advantageously, the active life of the novel catalysts of our invention may be extended substantially in vapor phase dehydration reactions if the flow of the polyhydroxy compound undergoing dehydration is interrupted at intervals and a current of steam passed over the heated catalyst in the reaction chamber. Such steaming of the catalysts is particularly effective during the vapor phase dehydration of 1:3-butane-diol to butadiene, the intermediate steaming effectively maintaining the the average rate of conversion to butadiene at a level considerably higher than that obtained without intermediate steaming and, in addition, prolonging the commercially effective life of the catalyst.

In order further to illustrate our invention but without being limited thereto the following examples are given:

Example I 100 parts by weight of primary sodium phosphate and 45 parts by weight of 85% phosphoric acid are mixed in 55 parts by weight of water to give a viscous solution. The solution is thoroughly mixed with 125 parts by weight of secondary calcium phosphate to form a thick paste and the latter is poured on to a flat shallow pan and dried with stirring at 110° C. for 24 hours. The solid cake obtained is broken down into particles having a diameter of from ¼ to ½ inch. The particles are dried for one hour at a temperature of 160° C. The particles are hard and porous and give an acid reaction to methyl-orange indicator and may be employed for the catalytic dehydration of aliphatic poly-hydroxy compounds.

The dehydration reaction is carried out after charging 85 parts by weight of the above catalyst in a reaction chamber and raising the temperature of the chamber to about 270° C. When the reaction chamber and catalyst have reached this temperature an 80% aqueous solution of 1:3-butane-diol is vaporized and the vapor is passed over the heated catalyst at the rate of 43 parts by weight per hour. The initial activity of the catalyst is such that it yields a conversion rate of 71% condensables, calculated as butadiene, and, after the first 7 hour reaction period the activity drops to a conversion rate of 63%. At intervals in the dehydration reaction the catalyst is subjected to steaming. After 63 hours of service the conversion rate effected by the catalyst is 55%.

The spent catalyst is regenerated as follows. The catalyst is first heated to a temperature of about 350° C. and is blown with air for 5 hours. The temperature is then lowered to 160° C. while blowing with steam and at 160° C. 50 parts by weight of water in the form of steam are passed over the catalyst in the course of 2 hours. The catalyst is regenerated by this process and is rendered more porous than the original catalyst. The activity of this regenerated catalyst is higher than the original catalyst, yielding a conversion of 80% condensables, calculated as butadiene, which rate drops to only 59% after 35 hours.

The catalyst may be regenerated several more times, being reactivated with each regeneration. The average conversion to condensable materials employing this catalyst, determined over an extended period of time, is 65%.

Example II 125 parts by weight of primary sodium phosphate are dissolved in 150 parts by weight of water and 18 parts by weight of 85% phosphoric acid and 15 parts by weight of primary N-butylamine phosphate are added to the solution. 100 parts by weight of pea-sized pumice particles are added to the mixture and the latter is evaporated to dryness on a steam bath with frequent mixing. The dried material obtained is then placed in an oven at 10° C. and maintained therein for 12 hours. After further drying for one hour at 160° C. the catalyst is ready for use. The pea-sized particles obtained are strong, moderately porous on the surface and are acid to methyl-orange.

60 parts by weight of the catalyst are placed in a reaction chamber maintained at about 270° C. and an aqueous solution comprising 80% 1:3-butane-diol, in vapor form, is passed over the catalyst at a rate which is just under 20 parts by weight per hour. The initial conversion rate is 70% condensables, which rate rises to 75% after 2 hours, and then drops gradually so that after 15 hours longer the conversion rate is 62%. Of these condensable materials about 97% is butadiene.

The catalyst is regenerated by burning with air and steam at 350° C. for 4 hours and is then taken down to 130 to 160° C. with vapors of an aqueous solution comprising 20% N-butylamine. The catalyst is regenerated by this treatment and when reacted with an 80% solution of aqueous 1:3-butane-diol containing 3% of N-butylamine yields a conversion of 67% condensable. This catalyst yields butadiene of an unusual degree of purity.

Example III 125 parts by weight of primary sodium phosphate, 15 parts by weight of primary N-butylamine phosphate and 13 parts by weight of 85% phosphoric acid are dissolved in 100 parts by weight of water. 100 parts by weight of ⅛ inch "Nuchar" carbon particles are added to this solution and with frequent mixing the mixture obtained is evaporated to dryness on a steam bath. The catalyst is dried at 110° C. for 12 hours and is finally dried for one hour at 160° C. to render it suitable for the catalytic dehydration process.

100 parts by weight of catalyst are placed in the reaction chamber and heated to 260° C. and 80% aqueous solution of 1:3-butane-diol in vapor form passed over the catalyst at the rate of about 20 parts by weight per hour. At the end of a 5 hour period the conversion rate is 63% condensables. The catalyst is then steamed and the temperature is raised to 285° C., being maintained at that temperature for the next 5 hours while diol vapors are passed therein at the same rate. This dehydration reaction yields a conversion of 82% condensables. The catalyst is again steamed and the rate of feed of the 1:3-butane-diol vapors is increased slightly to 30 parts per hour and under these conditions the conversion rate is raised to 84%. After steaming again the temperature of the reaction chamber containing the catalyst is raised to 300° C. and the feed rate lowered slightly to 25 parts per hour, which procedure yields a conversion of 80% condensables. The frequent steaming aids substantially in maintaining the conversion rate at a very high level.

Example IV 25 parts by weight of primary sodium phosphate and 10 parts by weight of secondary ammonium phosphate are dissolved in 50 parts by weight of water and 100 grams of secondary calcium phosphate are mixed therewith to yield a paste. The paste is dried at 110° C. for 12 hours during which time some ammonia gas is liberated. The catalytic material obtained is alkaline to methyl-orange. The catalyst is then broken down into particles of from ¼ to ⅜ inch in diameter and the particles are heated for one hour at 160° C. before being employed for the dehydration reaction.

About 50 parts by weight of this catalyst are charged in the reaction chamber and heated to a temperature of 260 to 280° C. Vapors of an 80% aqueous solution of 1:3-butane-diol are passed over the catalyst at a rate of about 17 parts by weight per hour yielding a conversion of 80% condensables. The conversion rate gradually increased to 85% by the end of 20 hours. At the end of 40 hours the conversion rate is 69%.

Example V 100 parts by weight of primary sodium phosphate, 27.5 parts by weight of phosphoric acid and 15 parts by weight of primary N-butylamine phosphate are mixed with 75 parts by weight of water to form a thick solution. 125 parts by weight of powdered secondary calcium phosphate are mixed in the solution to form a paste and the latter is poured out on a flat pan and dried at 110° C. with frequent mixing for from 12 to 18 hours. The cake formed is then broken into ¼ to ½ inch particles. The catalyst has an acid reaction to methyl-orange.

90 parts by weight of this catalyst are charged into the reaction chamber and heated at 160° C. for one hour. The catalyst is heated to 260 to 270° C. and vapors of an 80% of aqueous solution of 1:3-butane-diol are passed over the heated catalyst at a rate of 25 parts per hour. The conversion rate obtained is 77% condensables which rate slowly decreases. After 42 hours the conversion rate is 61%.

The spent catalyst may be regenerated by burning with air at 350° C. followed by a treatment with N-butylamine solution, as in Example II. If the N-butylamine treatment is omitted, the catalyst obtained after burning at 350° C. is quite similar to the regenerated catalyst obtained in the manner described in Example I with regard to both its chemical and physical properties.

It is to be understood that the foregoing detailed description is given merely by way of illustration and that many variations may be made therein without departing from the spirit of our invention.

Having described our invention, what we desire to secure by Letters Patent is:

1. Process for the production of butadiene by the catalytic vapor phase dehydration of 1:3-butane-diol, which comprises passing the vapors of 1:3-butane-diol over a catalyst consisting essentially of a mixture of primary sodium phosphate and secondary calcium phosphate in substantially equimolecular proportions, free phosphoric acid and primary N-butylamine phosphate, at a temperature of 250 to 300° C., and separating butadiene from the products formed.

2. Process for the production of butadiene by the catalytic vapor phase dehydration of 1:3-butane-diol, which comprises passing the vapors of 1:3-butane-diol over a catalyst consisting essentially of a mixture of primary sodium phosphate and secondary calcium phosphate in substantially equimolecular proportions, free phosphoric acid and primary N-butylamine phosphate, at a temperature of 250 to 300° C., steaming the catalyst at intervals during the dehydration reaction, and separating butadiene from the products formed.

3. Process for the production of butadiene by the catalytic vapor phase dehydration of 1:3-butane-diol, which comprises passing the vapors of 1:3-butane-diol over a regenerated catalyst consisting essentially of a mixture of primary sodium phosphate and secondary calcium phosphate in substantially equimolecular proportions, free phosphoric acid and primary N-butylamine phosphate, at a temperature of 250 to 300° C., and separating butadiene from the products formed.

4. Process for the regeneration of spent catalyst employed in the vapor phase dehydration of 1:3-butane-diol, said catalyst consisting essentially of a mixture of primary sodium phosphate and secondary calcium phosphate in substantially equimolecular proportions, free phosphoric acid and a salt of phosphoric acid that decomposes under reaction conditions to yield phosphoric acid, which comprises subjecting said spent catalyst to a temperature of about 350° C. while passing a current of air and water vapor over the said catalyst, reducing the temperature to 140 to 160° C. and passing steam over the said catalyst, the steam containing a volatile basic compound adapted to form with the phosphoric acid present, a salt decomposable at dehydration temperatures to yield phosphoric acid.

5. Process for the regeneration of spent catalyst employed in the vapor phase dehydration of 1:3-butane-diol, said catalyst consisting essentially of a mixture of primary sodium phosphate and secondary calcium phosphate in substantially equimolecular proportions, free phosphoric acid and a salt of phosphoric acid that decomposes under reaction conditions to yield free phosphoric acid, which comprises subjecting said spent catalyst to a temperature of about 350° C. while passing a current of air and water vapor over the said catalyst, reducing the temperature to 140 to 160° C. and passing steam over the said catalyst, the steam containing N-butylamine vapor.

6. A catalyst for the vapor phase dehydration of 1:3-butane-diol consisting essentially of a mixture of primary sodium phosphate and secondary calcium phosphate in substantially equimolecular proportions, free phosphoric acid and a salt of phosphoric acid that decomposes under reaction conditions to yield free phosphoric acid.

7. A catalyst for the vapor phase dehydration of 1:3-butane-diol consisting essentially of a mixture of primary sodium phosphate and secondary calcium phosphate in substantially equimolecular proportions, free phosphoric acid and N-butylamine phosphate.

GEORGE W. SEYMOUR.
FRED FORTESS.

REFERENCES CITED

The following references are of record in the file of this patent:

UNITED STATES PATENTS

| Number | Name | Date |
|---|---|---|
| 1,841,055 | Reppe et al. | June 12, 1932 |
| 1,915,362 | Hanks et al. | June 27, 1933 |
| 1,923,569 | Cunradi (A) | Aug. 22, 1933 |
| 1,944,153 | Cunradi (B) | Jan. 23, 1934 |
| 2,004,521 | Mueller-Cunradi et al. | June 11, 1935 |
| 2,113,654 | Ipatieff et al. | Apr. 12, 1938 |
| 2,120,712 | Pyzel | June 14, 1938 |
| 2,158,154 | Rose | May 16, 1939 |
| 2,174,280 | Wellman | Sept. 26, 1939 |
| 2,204,157 | Simon | June 11, 1940 |
| 2,241,792 | Reppe et al. II | May 13, 1941 |
| 2,271,942 | Kenuecke et al. | Feb. 3, 1942 |
| 2,290,211 | Schaad | July 22, 1942 |
| 2,310,809 | Reppe et al. I | Feb. 9, 1943 |
| 2,369,693 | Tollefson | Feb. 20, 1945 |
| 2,373,153 | Tollefson | Apr. 10, 1945 |